US008644142B2

(12) United States Patent
Christie, IV

(10) Patent No.: US 8,644,142 B2
(45) Date of Patent: *Feb. 4, 2014

(54) MOBILITY IN A MULTI-ACCESS COMMUNICATION NETWORK

(75) Inventor: Samuel H. Christie, IV, Cary, NC (US)

(73) Assignee: Microsoft Corporation, Redmond, WA (US)

( * ) Notice: Subject to any disclaimer, the term of this patent is extended or adjusted under 35 U.S.C. 154(b) by 417 days.

This patent is subject to a terminal disclaimer.

(21) Appl. No.: 12/685,486

(22) Filed: Jan. 11, 2010

(65) Prior Publication Data

US 2010/0115105 A1     May 6, 2010

Related U.S. Application Data

(63) Continuation of application No. 10/628,167, filed on Jul. 28, 2003, now Pat. No. 7,646,710.

(51) Int. Cl.
*H04L 12/26* (2006.01)

(52) U.S. Cl.
USPC ............................. 370/230; 370/352; 709/223

(58) Field of Classification Search
USPC .................................. 370/230, 352; 709/223
See application file for complete search history.

(56) References Cited

U.S. PATENT DOCUMENTS

| 6,748,439 | B1 | 6/2004 | Monachello et al. |
| 6,862,277 | B2 | 3/2005 | Pan et al. |
| 7,016,326 | B2 | 3/2006 | Holeman et al. |
| 7,072,323 | B2 | 7/2006 | Roberts et al. |
| 7,072,657 | B2 | 7/2006 | Watanabe et al. |
| 7,251,490 | B2 | 7/2007 | Rimoni |
| 7,346,032 | B2 | 3/2008 | Holeman et al. |
| 7,499,705 | B2 | 3/2009 | Rimoni et al. |
| 7,646,710 | B2 * | 1/2010 | Christie, IV ................. 370/230 |
| 7,706,796 | B2 | 4/2010 | Rimoni et al. |
| 7,961,687 | B2 | 6/2011 | Holeman et al. |
| 2002/0026527 | A1 | 2/2002 | Das et al. |
| 2002/0087724 | A1 | 7/2002 | Datta et al. |

(Continued)

FOREIGN PATENT DOCUMENTS

| EP | 1 124 396 A2 | 8/2001 |
| WO | WO-0010306 | 2/2000 |

OTHER PUBLICATIONS

International Search Report for PCT/IB2004/002415 mailed Jan. 25, 2005.

(Continued)

*Primary Examiner* — Wei Zhao
(74) *Attorney, Agent, or Firm* — Wolfe-SBMC

(57) ABSTRACT

The present invention provides a terminal capable of establishing multiple communication sessions with a public network proxy through different access networks. The terminal actively communicates with the public network proxy to control which of the multiple communication paths are active, as well as control the transition from actively using one communication path to using another. The public network proxy facilitates data and voice sessions between the terminal and any number of other communication devices. In one embodiment, the communication sessions are reserved tunneling sessions, and the terminal cooperates with the public network proxy to effectively control how many tunneling sessions are established, how many tunneling sessions are active at any given time, and the transition from one tunneling session to another for active communications. Each of the communication or tunneling sessions may be established over different access networks using different communication technologies and protocols.

20 Claims, 4 Drawing Sheets

(56) References Cited

U.S. PATENT DOCUMENTS

| | | |
|---|---|---|
| 2003/0108007 A1 | 6/2003 | Holeman et al. |
| 2003/0133425 A1 | 7/2003 | Radhakrishnan et al. |
| 2003/0172145 A1* | 9/2003 | Nguyen .................. 709/223 |
| 2003/0219022 A1* | 11/2003 | Dillon et al. ............ 370/395.52 |
| 2003/0227883 A1 | 12/2003 | Rimoni et al. |
| 2004/0073642 A1 | 4/2004 | Iyer |
| 2004/0205233 A1 | 10/2004 | Dunk |
| 2005/0037758 A1 | 2/2005 | Rimoni |
| 2007/0049274 A1 | 3/2007 | Yacobi et al. |
| 2007/0049276 A1 | 3/2007 | Rimoni et al. |
| 2008/0161001 A1 | 7/2008 | Holeman et al. |
| 2011/0064058 A1 | 3/2011 | Rimoni et al. |

OTHER PUBLICATIONS

"Foreign Office Action", Canadian Application No. 2533875, (Feb. 27, 2012), 3 pages.

"Written Opinion", Application No. PCT/IB2004/002415, (Feb. 2, 2005), 6 pages.

"Foreign Office Action", Canada Application No. 2,533,875, (May 13, 2013), 3 Pages.

"Foreign Notice of Allowance", Canadian Application No. 2,533,875, (Oct. 11, 2013), 2 Pages.

* cited by examiner

MOBILITY IN A MULTI-ACCESS COMMUNICATION NETWORK

FIELD OF THE INVENTION

The present invention relates to communications, and in particular to allowing a mobile terminal to communicate with other communication devices via disparate access networks.

BACKGROUND OF THE INVENTION

Expansion of packet-based networks, such as the Internet, is extending into mobile environments. Accordingly, mobile terminals equipped with wireless communication capability can now establish communication sessions with other communication devices in part over wireless communication channels. Unfortunately, there are numerous wireless communication networks using different communication technologies and protocols. In an effort to increase functionality, these mobile terminals may be equipped to communicate with different types of networks using the same or different access technologies. With such capabilities, there is a need for an efficient technique to allow the mobile terminals to communicate with the other communication devices over different access networks. There is a further need for an effective technique to transition through sequential connections over these different access networks as the user element moves from one access network to another.

SUMMARY OF THE INVENTION

The present invention provides a terminal with the capability of establishing multiple communication sessions with a public network proxy through different access networks. The terminal can actively communicate with the public network proxy to control which of the multiple communication paths are active, as well as control the transition from actively using one communication path to using another. The public network proxy will facilitate communications between the terminal and any number of other communication devices to facilitate data or voice sessions. In one embodiment, the communication sessions are reserved tunneling sessions, and the terminal cooperates with the public network proxy to effectively control how many tunneling sessions are established, how many tunneling sessions are active at any given time, and the transition from one tunneling session to another for active communications. Each of the communication or tunneling sessions may be established over different access networks using different communication technologies and protocols.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
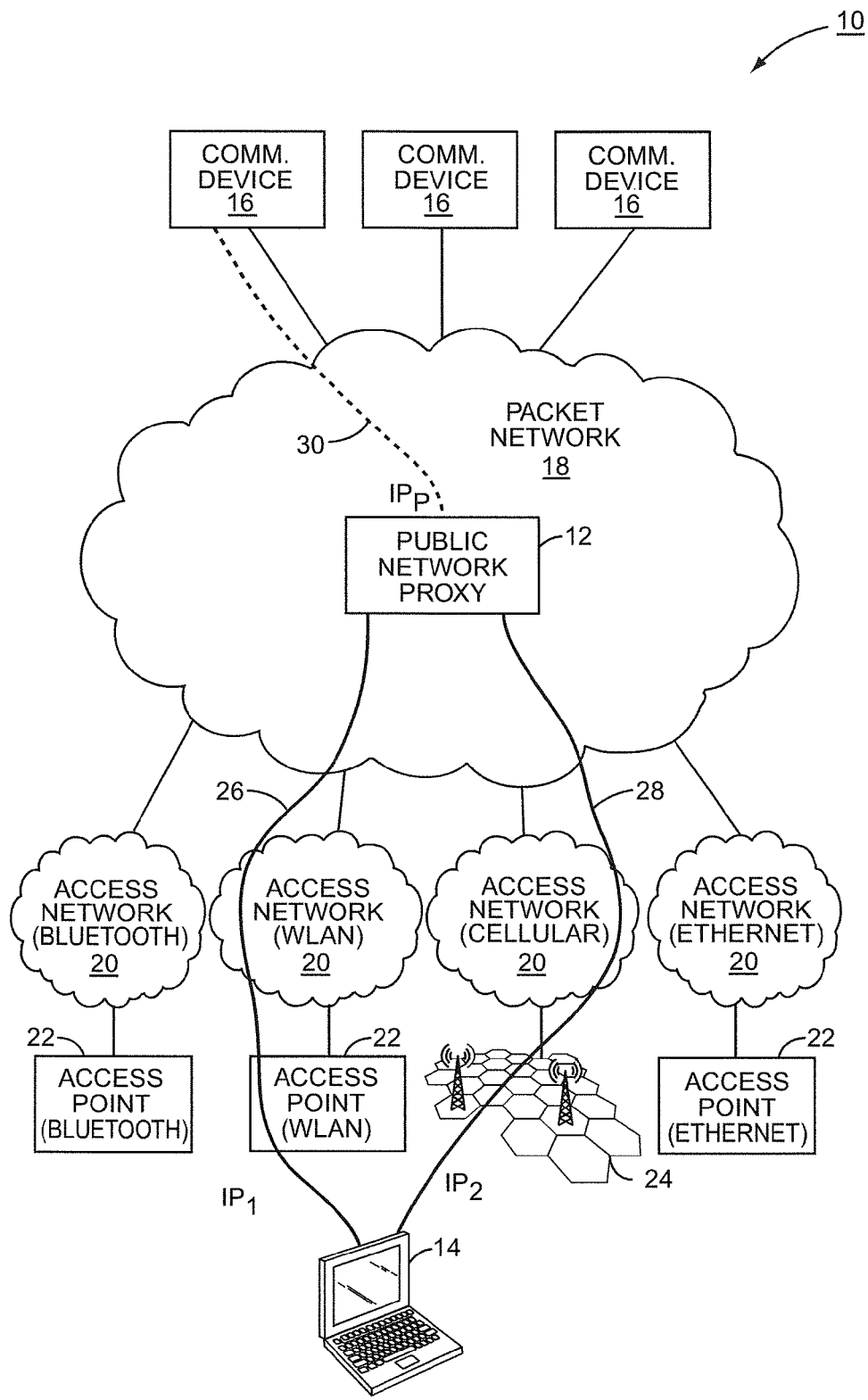
FIG. 1 is a block representation of a communication environment according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention allows a mobile terminal to effectively control the paths through which it will communicate with a public network proxy, which facilitates communications with any number of communication devices for data or voice applications. The different communication paths to the public network proxy may be supported by different access networks using different communication technologies and protocols. In operation, the mobile terminal will take the necessary steps to establish communication paths and determine which of these communication paths will be active and facilitate the transmission and reception of packets to and from the public network proxy. A decision between two available communication paths may be based on cost or performance characteristics. Based on instructions from the mobile terminal, the public network proxy will take the necessary steps to facilitate communications between the appropriate communication devices and the mobile terminal over the active communication path or paths, as well as facilitate handoffs from one access network to another. The handoffs will preferably be initiated by the mobile terminal via instructions sent to the public network proxy. Further, multiple communication paths may be active at the same time, wherein duplicate packets are simultaneously sent over different communication paths. Alternatively, the multiple communication paths may be used to increase transfer rates. In one embodiment, the communication paths are tunneling sessions established between the mobile terminal and the public network proxy via the various access networks using any number of tunneling protocols, such as through one or more Internet Protocol (IP) Security (SEC) connections or virtual private networks (VPNs).

To the correspondent communication devices, the mobile terminal will be associated with a public IP address, which is supported by the public network proxy. As such, packets sent to the mobile terminal will be sent to the public network proxy using the public IP address of the mobile terminal. Depending on the access network through which the mobile terminal can be reached by the public network proxy, different temporary IP addresses will be assigned to the mobile terminal for the various access networks. The public network proxy will use the appropriate temporary IP address for forwarding the packets received from the communication devices on to the mobile terminal within the confines of the tunneling protocols. In return, the mobile terminal will encapsulate packets intended for the communication devices using the appropriate tunneling protocols, which effects delivery of the packets initially to the public network proxy, which will extract the original packets and forward them as necessary to the communication devices. Again, the packets transferred between the mobile terminal and the communication devices through the public network proxy may include voice or data, the latter of which may include virtually any type of information, audio, or video.

With reference to FIG. 1, a communication environment 10 according to the present invention is illustrated, wherein the mobile terminal 14 is capable of communicating with numerous communication devices 16 with the aid of the public network proxy 12. The mobile terminal 14 may be any portable device capable of facilitating communications via multiple access networks. Examples include personal computers, personal digital assistants, mobile telephones, or any other device benefiting from communicating with remote communication devices. In general, the public network proxy 12 and the communication devices 16 are directly or indirectly coupled to a packet network 18, which is further coupled to numerous access networks 20. These access networks 20 may support various wired or wireless communications with the mobile terminal 14, depending on the communication capabilities of the mobile terminal 14. As illustrated for exemplary purposes only, there are four access networks 20 operatively coupled to the packet network 18, wherein each access network 20 supports one of the following communication technologies: local wireless (Bluetooth), wireless local area network (WLAN), cellular, and traditional wired Ethernet. Although only one of each type of access network 20 is illustrated, there may be multiple access network 20 providing disparate or overlapping coverage. For each of the access networks 20, an access point 22 that is capable of providing the actual wired or wireless communication link to the mobile terminal 14 is provided. For the Bluetooth and WLAN access networks 20, the access points 22 may be a simple Bluetooth or WLAN modem, which is capable of providing bi-directional wireless communications with the mobile terminal 14. The access point or points for a cellular access network 20 is generally a cellular network of base stations 24 operating in traditional fashion. Further, the Ethernet-based access network 20 will have an access point 22 capable of supporting a wired Ethernet connection.

Regardless of the communication technology incorporated by the access network 20 and associated access point 22, the mobile terminal 14 is capable of establishing communications with the access network 20 via the access points 22 (or base stations 24), and ultimately with the public network proxy 12 via the packet network 18 using any available communication protocol, and preferably a tunneling protocol to effectively define a communication path between the mobile terminal 14 and the public network proxy 12.

Figure 2:
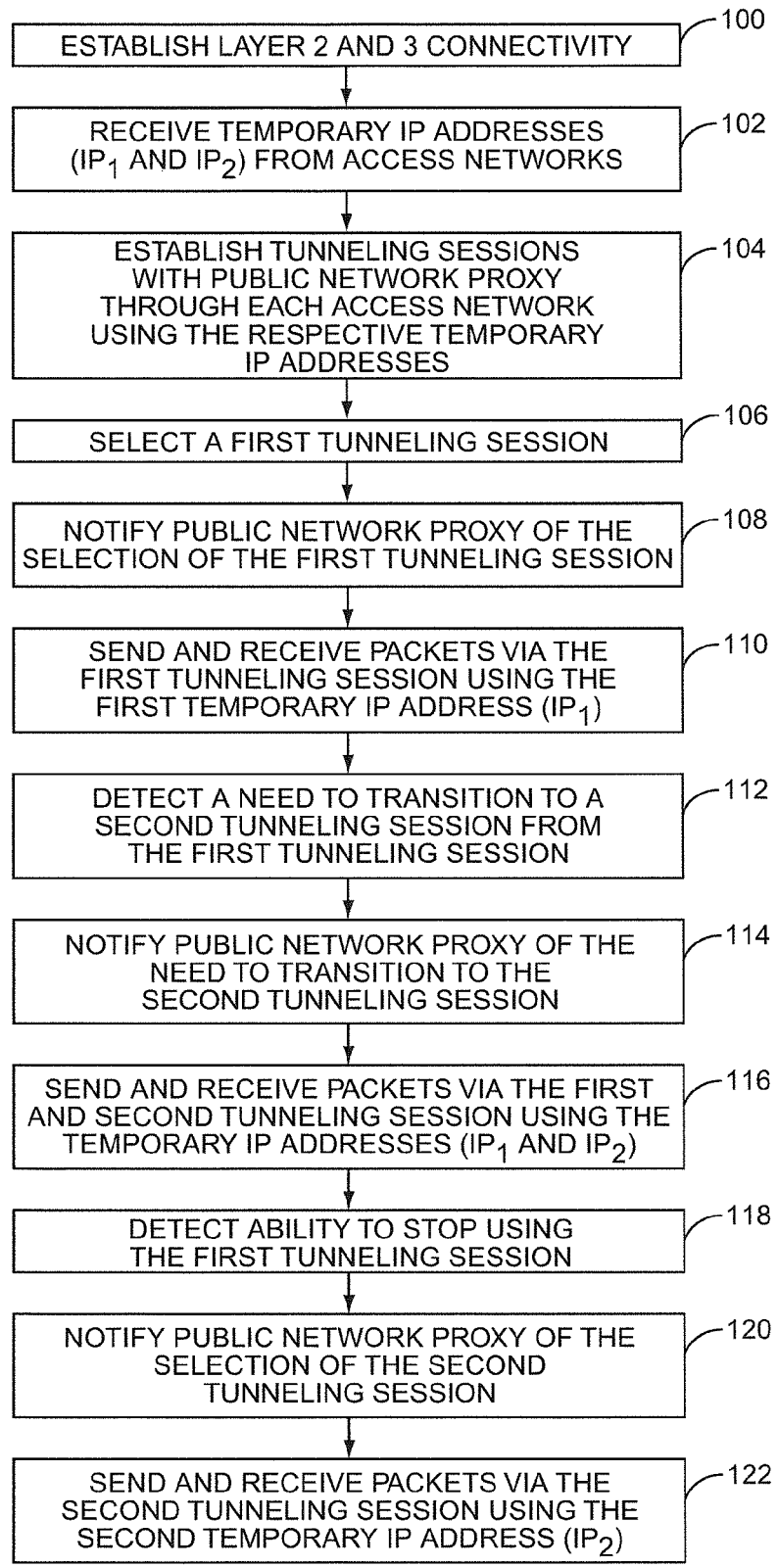
FIG. 2 is a flow diagram illustrating basic operation of a mobile terminal according to one embodiment of the present invention.

In operation, the mobile terminal 14 is capable of establishing tunneling sessions through multiple ones of the access networks 20 as communication capability permits. As such, at any given time, the mobile terminal 14 may have multiple tunneling sessions through which communications with the public network proxy 12 can be supported. With reference now to FIG. 2, a flow diagram is provided to illustrate how communications between the mobile terminal 14 and the public network proxy 12 are established and controlled predominantly by the mobile terminal 14.

Initially, the mobile terminal 14 will establish layer 2 and 3 connectivity with one or more available access networks 20 via the respective access points 22 (which include the base stations 24) (step 100). Although the flow diagram of FIG. 2 focuses on using two connections, the invention is applicable for any number of connections. Further, each connection may be fully separate in setup and function with respect to other connections. The access networks 20 will recognize the connectivity and the packet capability of the mobile terminal 14 and provide temporary IP addresses, designated $IP_1$ and $IP_2$, for the WLAN and cellular access networks 20, respectively, and send the temporary IP addresses $IP_1$ and $IP_2$ to the mobile terminal 14. The mobile terminal 14 will receive the temporary IP addresses $IP_1$ and $IP_2$ from the respective access networks 20 (step 102), and establish tunneling sessions with the public network proxy 12 through each access network 20 using the respective temporary IP addresses (step 104). Notably, the communication devices 16 will use the primary address for the mobile terminal 14, $IP_P$, to send packets toward the mobile terminal 14, wherein the packets will actually be received by the public network proxy 12 on behalf of the mobile terminal 14.

At this point, the mobile terminal 14 has established two tunneling sessions, referenced as 26 and 28 in FIG. 1. In one embodiment, the mobile terminal 14 will select a first tunneling session to be an active tunneling session (step 106) and notify the public network proxy 12 of the selection of the first tunneling session as the primary tunneling session (step 108). Such selection may be accomplished in many ways. For example, the mobile terminal 14 may establish multiple IP Security (IPSec) tunnels using the same credentials. The public network proxy 12 will recognize it as the same client. Then, by choosing to send the outbound packets over one tunnel, it will be defined as the active tunnel. If the mobile terminal 14 uses both tunnels to send packets, then the tunnels are in a load-sharing mode for increased bandwidth. If the mobile terminal 14 uses both tunnels to send identical packets, then the mobile terminal 14 is using the two channels for improved reliability or to begin the process of transitioning from one tunnel being active to the other. Although the second tunneling session is available, the mobile terminal 14 and the public network proxy 12 will operate to send and receive packets via the first tunneling session 26 using the first temporary IP address, $IP_1$ (step 110). In the background, the public network proxy 12 will forward packets received from the mobile terminal 14 to the appropriate communication device 16, as well as receive packets from the communication devices 16 and forward them to the mobile terminal 14 using the first temporary IP address $IP_1$ within the first tunneling session 26.

At some point, assume that the mobile terminal 14 detects a need to transition to the second tunneling session 28 from the first tunneling session 26 due to observed communication errors, transmission rates, quality of service issues, or desired service plans (step 112). Accordingly, the mobile terminal 14 will notify the public network proxy 12 of the need to transition to the second tunneling session 28 through either of the first or second tunneling sessions 26, 28 (step 114). At this point, the public network proxy 12 may begin a transition phase, wherein the mobile terminal 14 and public network proxy 12 send and receive packets via the first and second tunneling sessions 26, 28 using the respective temporary IP addresses, $IP_1$ and $IP_2$ (step 116). Such a transition is beneficial to prevent a break in voice or streaming media services. During this transition or handoff, duplicate packets may be sent over the first and second tunneling sessions 26, 28, and the receiving entity, either the public network proxy 12 or the mobile terminal 14, may simply monitor packet header information, such as sequence numbering, to determine whether a packet is a duplicate packet of one which has already been received.

At some point during the transition period, the mobile terminal 14 will detect the desirability to stop using or the inability to use the first tunneling session 26 (step 118). The mobile terminal 14 may directly or indirectly notify the public network proxy 12 of the permanent selection of the second tunneling session 28 (step 120), by sending a signal or by no longer using or being able to use the connection. Thus, notification may be simply a recognition that the connection is no longer available or in use. The packets are then sent and received only via the second tunneling session 28 using the second temporary IP address, $IP_2$ (step 122).

In addition to selecting a first tunneling session 26 and transitioning as necessary to a second tunneling session 28 during handoffs between one access network 20 and another, the mobile terminal 14 can control the use of the multiple tunneling sessions in any desired fashion, wherein duplicate packets may be sent over the multiple tunneling sessions to improve communication resiliency and increase quality of service, as well as have different packets sent over the different tunneling sessions to increase effective transfer rates between the public network proxy 12 and the mobile terminal 14 in either direction. The mobile terminal 14 will effectively control the public network proxy 12 to determine when and how packets are sent and when handoffs from one tunneling session to another occur. Further, the mobile terminal 14 can decide how many tunneling sessions should be established, and how many of those established tunneling sessions are active. Accordingly, multiple tunneling sessions may be available at any given time, but only one or more of those tunneling sessions may be in active use. An active management system can be used to establish multiple tunnels independently and manage them in a desired fashion. As an example, the Session Initiation Protocol (SIP) may be used to enable a single session to have multiple streams. These streams can be added and removed and have attributes such as Codec, frame size, and the like. Any tunnel or connection could be used to carry the SIP messages, and the stream definitions could be modified to define which are active and whether they are in redundant or bandwidth augmentation mode.

Figure 3:
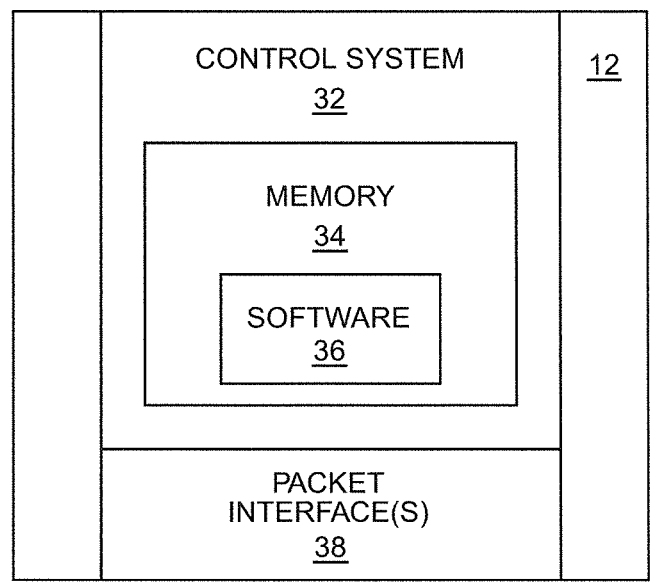
FIG. 3 is a block representation of a public network proxy according to one embodiment of the present invention.

Turning now to FIG. 3, a block diagram of a public network proxy 12 is illustrated. The public network proxy 12 will preferably include a control system 32, which may include a central processing unit (CPU), having sufficient memory 34 to store the software 36 necessary for operation as described above. The control system 32 is also associated with one or more packet interfaces 38 to facilitate communications with the various communication devices 16 and the access networks 20.

Figure 4:
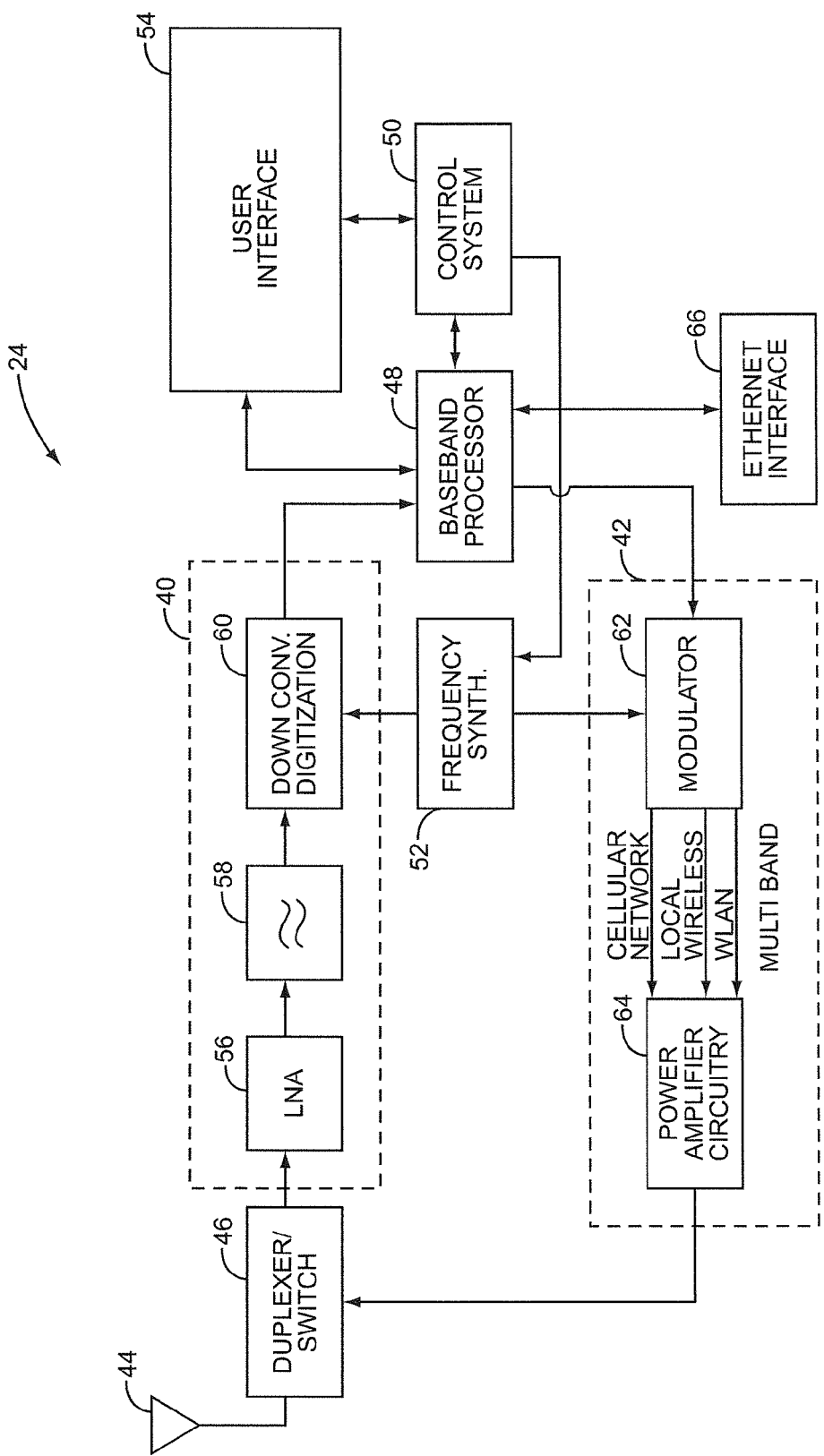
FIG. 4 is a block representation of a mobile terminal according to one embodiment of the present invention.

Those skilled in the art will recognize the numerous forms the mobile terminal 14 may take. The basic communication architecture of the mobile terminal 14 is represented in FIG. 4 and includes a receiver front end 40, a radio frequency transmitter section 42, an antenna 44, a duplexer or switch 46, a baseband processor 48, a control system 50, a frequency synthesizer 52, and an interface 54. The receiver front end 40 receives information bearing radio frequency signals from one or more remote transmitters provided by a base station. A low noise amplifier 56 amplifies the signal. A filter circuit 58 minimizes broadband interference in the received signal, while downconversion and digitization circuitry 60 downconverts the filtered, received signal to an intermediate or baseband frequency signal, which is then digitized into one or more digital streams. The receiver front end 40 typically uses one or more mixing frequencies generated by the frequency synthesizer 52. The baseband processor 48 processes the digitized received signal to extract the information or data bits conveyed in the received signal. This processing typically comprises demodulation, decoding, and error correction operations. As such, the baseband processor 48 is generally implemented in one or more digital signal processors (DSPs).

On the transmit side, the baseband processor 48 receives digitized data, which may represent voice, data, or control information, from the control system 50, which it encodes for transmission. The encoded data is output to the transmitter 42, where it is used by a modulator 62 to modulate a carrier signal that is at a desired transmit frequency. Power amplifier circuitry 64 amplifies the modulated carrier signal to a level appropriate for transmission, and delivers the amplified and modulated carrier signal to the antenna 44 through the duplexer or switch 46.

As noted above, the mobile terminal 14 must be able to communicate with multiple ones of the access networks 20 via the various access points 22, which are generally defined to include the network of base stations 24. Accordingly, the receiver front end 40, baseband processor 48, and radio frequency transmitter section 42 cooperate to provide one or more of the following interfaces: Bluetooth (or other local wireless interface), WLAN, or cellular. Further, an Ethernet interface 66 may be provided for a more traditional wired connection to a corresponding access network 20. Wireless communication capability may be implemented using redundant circuitry, or by configuring common circuitry to operate in different modes. The configuration of the mobile terminal 14 will be dictated by economics and designer choice. The mobile terminal 14 is configured such that the proper mode of operation is selected by the control system 50, which will also implement the necessary protocols and packet processing for the various communication technologies. As noted above, the above communication circuitry is preferably configured to effectively communicate in different modes at the same time. Further, a user may interact with the mobile terminal 14 via the interface 54, which may include interface circuitry associated with a microphone, a speaker, a keypad, and a display.

Those skilled in the art will recognize improvements and modifications to the preferred embodiments of the present invention. All such improvements and modifications are considered within the scope of the concepts disclosed herein and the claims that follow.

What is claimed is:

1. A method for facilitating packet communications from a terminal to a network proxy comprising:
   - establishing a plurality of communication sessions via a plurality of access networks with the network proxy, which facilitates communications between the terminal and at least one communication device;
   - selecting one of the plurality of communication sessions to be a first active communication session, wherein the selecting is based on one or more factors related to the access networks pertaining to cost or performance;
   - identifying the first active communication session to the network proxy; and
   - transferring packets to or from the network proxy using the first active communication session to effect communications with the at least one communication device.

2. The method of claim 1, further comprising:
   - selecting at least a second one of the plurality of communication sessions to be a second active communication session wherein there are at least first and second active communication sessions; and
   - transferring packets to or from the network proxy using the first and second active communication sessions to effect the communications with the at least one communication device.

3. The method of claim 1, wherein the one or more factors related to the access networks comprise communication errors.

4. The method of claim 1, wherein the one or more factors related to the access networks comprise transmission rate.

5. The method of claim 1, wherein the one or more factors related to the access networks comprise quality of service.

6. The method of claim 1, wherein the one or more factors related to the access networks comprises one or more rate plans associated with the access networks.

7. A terminal for facilitating packet communications over a plurality of access networks comprising:
   communication circuitry that facilitates communications with the plurality of access networks; and
   a control system associated with the communication circuitry, wherein the control system is configured to:
      establish a plurality of communication sessions via the plurality of access networks with a network proxy, which facilitates communications between the terminal and at least one communication device;
      select one of the plurality of communication sessions to be a first active communication session, wherein the selection is based on one or more factors related to the access networks pertaining to cost or performance;
      identify the first active communication session to the network proxy; and
      transfer packets to or from the network proxy using the first active communication session to effect communications with the at least one communication device.

8. The terminal of claim 7, wherein the control system is further configured to:
   select at least a second one of the plurality of communication sessions to be a second active communication session wherein there are at least first and second active communication sessions; and
   transfer packets to or from the network proxy using the first and second active communication sessions to effect the communications with the at least one communication device.

9. The terminal of claim 7, wherein the one or more factors related to the access networks comprises communication errors.

10. The terminal of claim 7, wherein the one or more factors related to the access networks comprises transmission rate.

11. The terminal of claim 7, wherein the one or more factors related to the access networks comprises quality of service.

12. The terminal of claim 7, wherein the one or more factors related to the access networks comprises one or more rate plans associated with the access networks.

13. One or more computer hardware storage media having stored thereon executable instructions which, when executed by one or more processors, cause the one or more processors to:
   establish a plurality of communication sessions via a plurality of access networks, with a network proxy, which facilitates communications between a terminal and at least one communication device;
   select one of the plurality of communication sessions to be a first active communication session, wherein the selection is based on one or more factors related to the access networks pertaining to cost or performance;
   identify the first active communication session to the network proxy; and
   transfer packets to or from the network proxy using the first active communication session to effect communications with the at least one communication device.

14. The one or more computer hardware storage media as recited in claim 13, wherein the instructions further cause the one or more processors to:
   select at least a second one of the plurality of communication sessions to be a second active communication session wherein there are at least first and second active communication sessions; and
   transfer packets to or from the network proxy using the first and second active communication sessions to effect the communications with the at least one communication device.

15. The one or more computer hardware storage media as recited in claim 14, wherein the packets transferred using the first active communication session carry information different than information carried in the packets transferred using the second active communication session.

16. The one or more computer hardware storage media as recited in claim 14, wherein the instructions further cause the one or more processors to duplicate the packets and send duplicated packets, respectively, over both the first and second active communication sessions.

17. The one or more computer hardware storage media as recited in claim 13, wherein the selection is based on one or more factors related to the access networks pertaining to cost or performance; and
   the one or more factors related to the access networks comprise at least communication errors.

18. The one or more computer hardware storage media as recited in claim 13, wherein the selection is based on one or more factors related to the access networks pertaining to cost or performance; and
   the one or more factors related to the access networks comprise at least transmission rate.

19. The one or more computer hardware storage media as recited in claim 13, wherein the selection is based on one or more factors related to the access networks pertaining to cost or performance; and
   the one or more factors related to the access networks comprise at least quality of service.

20. The one or more computer hardware storage media as recited in claim 13, wherein the selection is based on one or more factors related to the access networks pertaining to cost or performance; and
   the one or more factors related to the access networks comprise at least one or more rate plans associated with the access networks.

* * * * *